(12) United States Patent
Chen

(10) Patent No.: US 8,855,799 B2
(45) Date of Patent: Oct. 7, 2014

(54) AUTOMATED MASS PRODUCTION METHOD AND SYSTEM THEREOF

(75) Inventor: Ming-Xing Chen, Hsinchu (TW)

(73) Assignee: Skymedi Corporation, Hsinchu (TW)

( * ) Notice: Subject to any disclaimer, the term of this patent is extended or adjusted under 35 U.S.C. 154(b) by 419 days.

(21) Appl. No.: 13/371,439

(22) Filed: Feb. 12, 2012

(65) Prior Publication Data

US 2013/0211568 A1 Aug. 15, 2013

(51) Int. Cl.
*G06F 19/00* (2011.01)
*G05B 23/02* (2006.01)

(52) U.S. Cl.
USPC ............... 700/96; 700/95; 700/104; 700/117; 700/169; 340/3.1; 340/3.3; 340/3.31; 340/3.32; 340/3.9

(58) Field of Classification Search
CPC .................. G05B 2219/31369; G05B 19/4186
USPC ........ 700/95–96, 104, 117, 169; 340/3.1, 3.3, 340/3.31, 3.32, 3.9
See application file for complete search history.

(56) References Cited

U.S. PATENT DOCUMENTS

| | | | |
|---|---|---|---|
| 5,896,292 A * | 4/1999 | Hosaka et al. ................. | 700/108 |
| 5,956,465 A * | 9/1999 | Takagi et al. .................. | 700/255 |
| 6,792,615 B1 * | 9/2004 | Rowe et al. ..................... | 725/37 |
| RE44,248 E * | 5/2013 | Poirier .......................... | 704/235 |
| 2003/0176942 A1 * | 9/2003 | Sleep et al. .................... | 700/213 |
| 2005/0060759 A1 * | 3/2005 | Rowe et al. .................... | 725/143 |
| 2006/0229904 A1 * | 10/2006 | Hunter et al. .................... | 705/1 |
| 2009/0204267 A1 * | 8/2009 | Sustaeta et al. ................ | 700/291 |
| 2011/0208353 A1 * | 8/2011 | Kjellsson et al. .............. | 700/245 |
| 2012/0150677 A1 * | 6/2012 | Shuster ......................... | 705/26.1 |
| 2012/0226368 A1 * | 9/2012 | Thomson et al. ............... | 700/87 |
| 2014/0046872 A1 * | 2/2014 | Arnott et al. ................. | 705/36 R |

* cited by examiner

*Primary Examiner* — Ramesh Patel
(74) *Attorney, Agent, or Firm* — Li & Cai Intellectual Property (USA) Office

(57) ABSTRACT

An exemplary embodiment of the present disclosure illustrates an automated mass production method, adapted for an automated mass production system in manufacturing at least an electronic device having a storage unit, the method includes steps of: determining a protocol type of the Auto Handler to select one of the agents; establishing a first communication protocol communication between the MP tool module and the selected agent; establishing a second communication protocol communication between the selected agent and the Auto Handler; the Auto Handler outputting a processing command to the selected agent; the selected agent converting the processing command into a MP tool module executable MP tool instruction; and the selected agent outputting the corresponding MP tool instruction to the MP tool module so as to have the MP tool module executed the MP tool instruction to automatically perform a corresponding mass production process to the electronic device.

18 Claims, 5 Drawing Sheets

AUTOMATED MASS PRODUCTION METHOD AND SYSTEM THEREOF

BACKGROUND

1. Technical Field

The present disclosure relates to a mass production method and system in particular, to an automated mass production system and method adapted for manufacturing a non-volatile memory device.

2. Description of Related Art

Recently, because of the smaller physical size and low power dissipation characteristic, non-volatile memory, e.g., flash memory, has been used to replace the conventional magnetic disk storage media for portable electronic devices.

One of the typical applications of flash memory is in the USB electronic flash memory, which is known to be portable, low power devices utilizing Universal Serial Bus (USB) technology for interfacing between a host computer (e.g., desktop or laptop) and the USB electronic flash memory. Further, other electronic flash memory applications may take forms in many types of electronic devices including MP3 layer, cellular phone, digital camera, storage device (e.g., memory cards and solid state drive (SSD) disk), and etc.

Consequently, as the popularity of flash memory technology increase rapidly, the associated manufacturing volume increases as well. It is known to those skilled in the art that any flash memory devices before it is ready for the end user to use, series of steps of testing and formatting process must be performed. To meet the high volume of flash memory devices production, manufacturers adopt automated equipment to perform the necessary manufacturing processes such as the initiating card process.

In a typical automated flash memory device manufacturing process, a mass production tool (MP tool) is developed to coordinate with automated equipment to perform the above aforementioned manufacturing processes. However, the automated equipment for mass producing flash memory devices in practice adopts a predefined set of proprietary protocols, e.g., RS232, TCP/IP for data communication which is in general differed from the mass production tool, wherein the predefined proprietary protocols generally is set by the equipment vender. Furthermore, different automated equipment from different venders may use different data formats (such as different command names and parameters of the processing commands) for the same processing command. Consequently, code modifications must be done on the mass production tool prior to the production to have the mass production tool properly coordinated with specific automated equipment from the specific vender to establish the automated mass production process.

Moreover, in this mass production setting whenever the manufacturers need to replace the automated equipment or when the vender updates the automated equipment, the manufacturers generally have to redesign or modify the code of the mass production tool. In practice, each time the manufacturing modifies the code of the mass production tool, increases the production complexity thereby increase the production time and cost. Hence, the current set up for the flash memory device mass production system may be inefficiency and may not keep up with the increasing manufacturing volume of flash memory device production.

SUMMARY

An exemplary embodiment of the present disclosure illustrates an automated mass production method, adapted for an automated mass production system in manufacturing at least an electronic device having a storage unit. The automated mass production system includes a mass production tool (MP tool) module, a plurality of agents and at least an Auto Handler, wherein the plurality of agents is coupled between the MP tool module and the Auto Handler. The method includes steps of: determining a protocol type of the Auto Handler to select one of the agents; establishing a first communication protocol communication between the MP tool module and the selected agent; establishing a second communication protocol communication between the selected agent and the Auto Handler; the Auto Handler outputting a processing command to the selected agent; the selected agent converting the processing command into a MP tool instruction which is understood by the MP tool module; and the selected agent outputting the corresponding MP tool instruction to the MP tool module so as to have the MP tool module execute the MP tool instruction to automatically perform a corresponding mass production process to the electronic device.

An exemplary embodiment of the present disclosure illustrates an automated mass production system adapted for manufacturing at least an electronic device having a storage unit. The automated mass production system includes a mass production tool (MP tool) module, at least an Auto Handler, and a plurality of agents. The MP tool module is used for performing a mass production process to the electronic device according to an execution of a MP tool instruction and performing data communication using a predefined first communication protocol. The Auto Handler is used for generating a processing command according to an automated mass production process routine and outputting the processing command using a predefined second communication protocol to control the operation of the MP tool module. The plurality of agents is coupled between the MP tool module and the Auto Handler. Moreover, only one agent is capable of receiving the processing command using the second communication protocol. The agent further converts the processing command into the MP tool instruction and outputs to the MP tool module using the first communication protocol. The MP tool module determines the type of the second communication protocol and controls a first multiplexer to select an appropriate agent to establish communication between the MP tool module and the Auto Handler. The selected agent further controls a second multiplexer to communicate with the Auto Handler, to perform data communication between the MP tool module and the Auto Handler, thereby establish automated mass production processing flow.

An exemplary embodiment of the present disclosure illustrates an automated mass production system adapted for manufacturing at least an electronic device having a storage unit. The automated mass production system includes a mass production tool (MP tool) module, an Auto Handlers, and an agent. The MP tool module is used for performing a mass production process to the electronic device according to an execution of a MP tool instruction and performing data communication using a predefined first communication protocol. The Auto Handler is capable of generating a processing command according to an automated mass production process routine and outputting the processing command to control the operation of the MP tool module. The agent is coupled between the MP tool module and the Auto Handler. The agent is capable of establishing the communication between the MP tool module and the Auto Handler by converting the processing command into the MP tool instruction thereby establish automated mass production processing flow.

According to one exemplary embodiment of the present disclosure, the automated mass production system further includes at least a dictionary unit. The dictionary unit is coupled to the agent through a third multiplexer. The dictionary unit includes a set of processing commands in accordance to the Auto Handler and the corresponding MP tool instructions in accordance to MP tool module. The selected agent further control the third multiplexer to selected the appropriate dictionary unit and utilizes the dictionary unit to convert the received processing command into the MP tool instruction.

According to one exemplary embodiment of the present disclosure the first and the second communication protocol takes form of at least one of a RS-232, a TCP/IP or a UDP.

According to one exemplary embodiment of the present disclosure the MP tool module is implemented by executing a programmable mass production program code and the agent is implemented by executing a corresponding programmable agent program code.

To sum up, the present disclosure illustrates an automated mass production method and system thereof for facilitating the production of at least an electronic device having a storage unit. The disclosed automated mass production system can utilize the concept of employing agent to coordinate the mass production tool (MP tool) module and the Auto Handler for proper data transmission to establish an automated mass production process in manufacturing the electronic device. The agent can automatically perform communication protocol and data conversion between the MP tool module and the Auto Handler without the need to modify the structure of the MP tool module according to different type of Auto Hander used in the system. Consequently, the overall mass production complexity and cost can be reduced while the overall production efficiency can be increase.

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
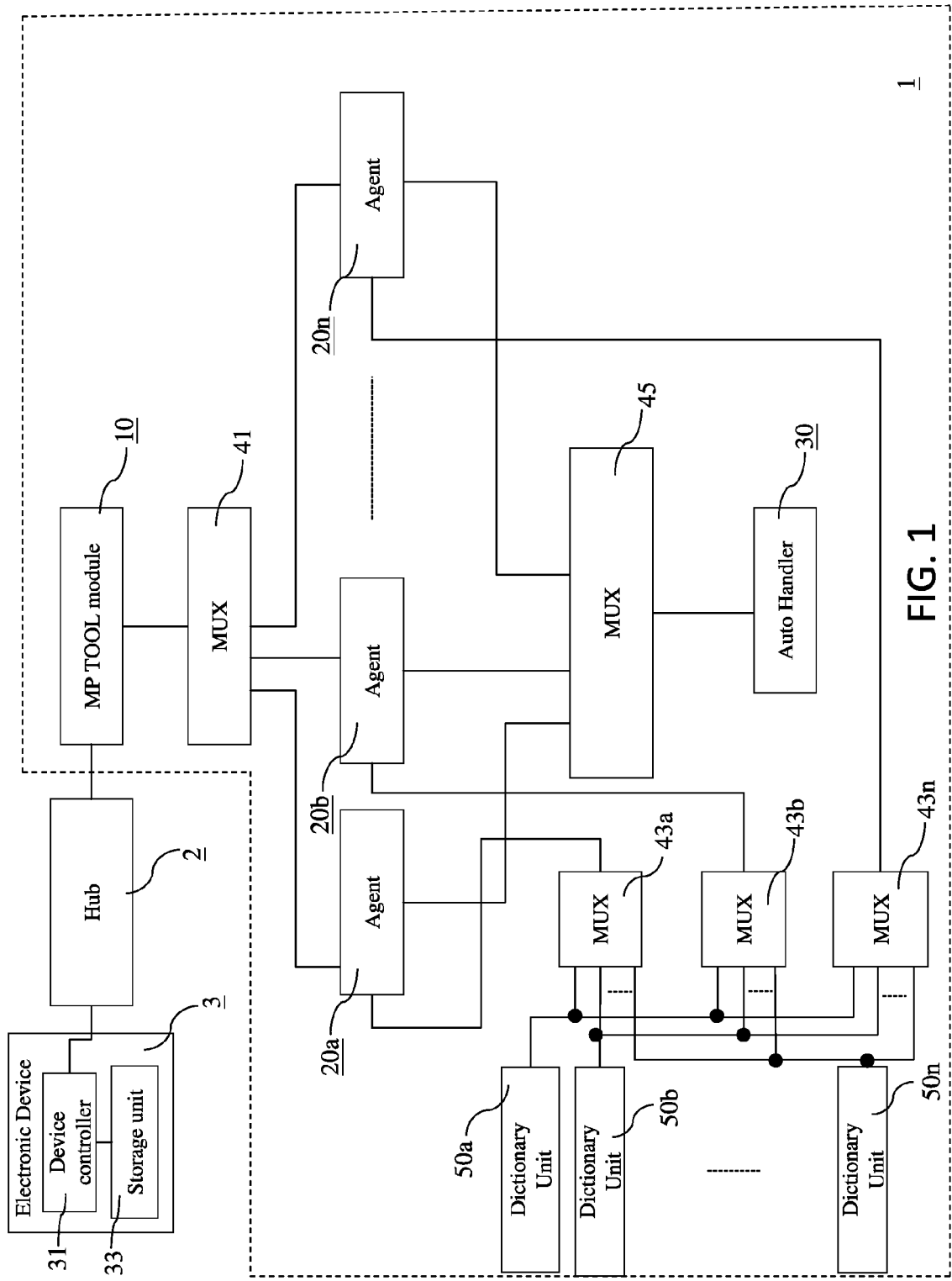
FIG. 1 depicts a block diagram of an automated mass production system in accordance to an exemplary embodiment of the present disclosure.

Reference will now be made in detail to the exemplary embodiments of the present disclosure, examples of which are illustrated in the accompanying drawings. Wherever possible, the same reference numbers are used in the drawings and the description to refer to the same or like parts.

(An Exemplary Embodiment of an Automated Mass Production System)

Please refer to FIG. 1, which illustrates a block diagram of an automated mass production system in accordance to an exemplary embodiment of the present disclosure. The described automated mass production system 1 can coordinate with automated equipments having different proprietary protocols and/or using different formats (such as command names and parameters of the processing commands) for the same processing command to conduct automated mass production without the need for adding or modifying the code of the mass production tool.

The automated mass production system 1 disclosed in the instant embodiment is coupled to a hub 2. The hub 2 is coupled to a device controller 31 of at least an electronic device 3. The device controller 31 is further coupled to the storage unit 33 within the electronic device 3. The electronic device 3 is a work piece to the automated mass production system 1. The electronic device 3 in the instant embodiment may be a pen drive storage devices, an MP3 player, a digital camera or a mobile phone. The storage unit 33 is a non-volatile flash memory storage unit, such as implemented by the NAND flash, NOR flash or EEPROM. The electronic device 3 may be any flash cards including but not limited to PCI Express, Secure Digital (SD) card, Memory Stick (MS), Compact Flash (CF), Multi-Media-Card (eMMC), IDE, and SATA flash memory devices. The automated mass production system 1 may be utilized to perform automated mass production processes (e.g., low-level formatting, encryption, disk type configuration) by means of writing the firmware and production parameters through the device controller 31 onto the storage unit 33.

As illustrated in FIG. 1, the automated mass production system 1 in the instant embodiment includes a mass production tool (MP tool) module 10, a plurality of agents 20a~20n, an Auto Handler 30, multiplexers (MUXs) 41, 45, 43a~43n, and a plurality of dictionary units 50a~50n. The MP tool module 10 is coupled to a multiplexer 41. The plurality of agents 20a~20n are respectively coupled between the multiplexer 41 and the multiplexer 45. Each and every dictionary units 50a~50n is respectively coupled to the plurality of agents 20a~20n through the multiplexers 43a~43n. The multiplexers 43a~43n correspond to the number of agents adopted in the system. The multiplexer 45 is coupled to the Auto Handler 30. The MP tool module 10 is further coupled to the hub 2.

The MP tool module 10 contains a programmable mass production program and can facilitate various automated mass production processes performed to the storage unit 33 through the device controller 31 of the electronic device 3. The Auto Handler 30 in the instant embodiment represents automated equipment developed by a vender. The Auto Handler 30 is used to transmit processing commands and collect information (e.g., mass production status) during the automated mass production process associated with the electronic device 3. The Auto Handler 30 can through establishing communication with the MP tool module 10, regulate the operations of the MP tool module 10.

As described previously, since the Auto Handler 30 is developed by the vender whereas the MP tool module 10 may be developed by the non-volatile memory controller manufacturer which may adopt different sets of communication protocol standards. The plurality of agents 20a~20n are placed for bridging communications between the MP tool module 10 and the Auto Handler 30. Or equivalently, the plurality of agents 20a~20n can perform communication protocol conversions. In other words, one of plurality of agents 20a~20n can convert the communication protocol (i.e., a first communication protocol) used by the MP tool module 10 into the communication protocol (i.e., a second communication protocol) adopted by the Auto Handler 30. Similarly, one of the plurality of agents 20a~20n can convert the communication protocol (i.e., the second communication protocol) used by the Auto Handler 30 into the communication protocol (i.e., the first communication protocol) adopted by the MP tool module 10. The plurality of agents 20a~20n may be modified or reconfigured in accordance to any changes in either the first or the second communication protocol.

Each agent may further include a first, a second communication interfaces (not shown) and a processing unit (not shown). The first communication interface shared a common communication protocol (i.e., a first communication protocol) with the MP tool module 10. The second communication interface on the other hand uses a predefined set of communication protocol in corresponding to a proprietary communication protocols (i.e., a second communication protocol) used by the Auto Handler 30. In other words, each agent (i.e., agents 20~20n) is configured to adapt a type of the communication protocol so as to interface with the second communication protocol adopted by the Auto Handler 30. Consequently, the second communication interfaces of the plurality of agents 20a~20n may each using different sets of communication protocols. The processing unit may contain a programmable agent program which can perform communication protocol and data conversions to establish a communication between the MP tool module 10 and the Auto Handler 30. It is worth to note that in the instant embodiment, the number of agents to be included in the automated mass production system 1 may vary in accordance to the number of sets of second communication protocols available in the automated mass production system 1.

The described communication protocols adopted in the system may be but not limited to a Recommended Standard 232 (RS-232), a Universal Serial Bus (USB) or internet protocols such as TCP/IP, UDP. However, the types of the first communication protocol adopted between the MP tool module 10 and the plurality of agents 20a~20n or the types of the second communication protocol adopted between the plurality of agents 20a~20n and the Auto Handler 30 may depend upon actual implementations thereof and shall not be limited by the examples provided in the instant disclosure.

The plurality of dictionary units 50a~50n may be categorized according to different types of Auto Handler 30. The plurality of dictionary units 50a~50n are used by each agents for converting the processing command generated by the Auto Handler 30 into a MP tool instruction which is able to be executed by the MP tool module 10. Each dictionary unit 50a~50n contains sets of processing commands and the corresponding MP tool instruction. Each agent may select an appropriate dictionary unit by controlling the operations of the connected multiplexer 43a~43n. In general, the dictionary units 50a~50n may each corresponds to different Auto Handler 30 associated with different vender. In the case of different Auto Handler 30 but of same vender, the Auto Handler 30 may use same format of processing command, consequently the associated dictionary unit may be shared by the different Auto Handler 30 of same vender. Moreover, the dictionary units 50a~50n can be modified along with changes made to corresponding Auto Handler 30. In additional, each dictionary unit 50a~50n may take form as a configurable look-up table data file, but the present disclosure is not limited thereto.

The MP tool module 10 and the plurality of agents 20a~20n are interfaced using the first communication protocol. One of the plurality of agents 20a~20n are configured to use the second communication protocol adopted by the Auto Handler 30. The MP tool module 10 may thus select a specific agent 20 out of the plurality of agents 20a~20n to perform the communication protocol conversion so as to communicate with the Auto Handler 30. The selected agent may further translate or convert the processing commands sent by the Auto Handler 30 into the MP tool instruction using a corresponding dictionary unit selected from the plurality of dictionary units 50a~50n. In other words, the Auto Handler 30 may automatically manage the manufacturing process by controlling the operation of MP tool module 10 though the selected agent from agent 20a~20n.

Specifically, the MP tool module 10 can interface with the plurality agents 20a~20n by the means of the multiplexer 41, 45 to communicate with the Auto Handler 30. The programmable mass production program of the MP tool module 10 may in the instant embodiment output an agent selection signal AS_SIG to the multiplexer 41 to select an appropriate agent to communicate with the Auto Handler 30. The agent selection signal AS_SIG may be generated based on the knowledge of the communication protocol of the Auto Handler 30. The programmable agent program of the selected agent may immediately generate and send a communication setup signal SET_SIG to the multiplexer 45 to establish the communication between the selected agent and the Auto Handler 30. Or equivalently, the communication setup signal SET_SIG generated by the selected agent controls the operation of the multiplexer 45 to establish a path of communication.

Once the communication between the MP tool module 10 and the Auto Handler 30 is well established, the Auto Handler 30 may communicate with the MP tool module 10 through the selected agent to perform automated mass production process. Since the Auto Handler 30 and the MP tool module 10 use different sets of communication protocols, the Auto Handler 30 and the MP tool module 10 may also have different interpretations over a given processing command. Hence, the selected agent can further function as a translator and converts the processing command transmitted by the Auto Handler 30 into a MP tool instruction.

The selected agent may select a corresponding dictionary unit through the multiplexer 43n coupled thereof and obtain a corresponding MP tool instruction. The selected agent then transmits the converted MP tool instruction to the MP tool module 10 for the MP tool module 10 to execute the processing command. Similarly, when the MP tool outputs the mass production status in accordance to a request processing command from the Auto Handler 30, the processing unit of the selected agent can convert the data format into Auto Handler understandable format. Consequently, the communication between the MP tool module 10 and the Auto Handler 30 can be well established and perform the commanded automated mass production process through the device controller 31 onto the storage unit 33 of the electronic device 3.

The basic operation of the automated mass production system 1 may be further explained using the following example. For instance, the MP tool module 10 may be configured to use RS-232 as the first communication protocol, while the vender may design the Auto Handler 30 with a TCP/IP as the second communication protocol. The first communication interface of the plurality of agents 20a~20n may thereby set to use the RS-232 communication protocols. On the other hand, the second communication interface of agent 20a may be RS-232. The second communication interface of agent 20b may use TCP/IP as the communication protocol. The second communication interface of agent 20c may use UDP as the communication protocol and so on. The dictionary unit 50a contains the set of processing commands used by the Auto Handler 30 and the corresponding MP tool instructions.

The programmable mass production program of the MP tool module 10 outputs the agent selection signal AS_SIG to the multiplexer 45 to select agent 20b as to communicate with the Auto Handler 30 at the start of the program. The programmable agent program of the agent 20b immediately generates and outputs the communication setup signal SET_SIG to control the multiplexer 45 to establish communication with the Auto Handler 30 so as to establish automated mass production process flow. The Auto Handler 30 can then conduct data communication with the agent 20b over the internet using TCP/IP protocols, while the agent 20b conducts data communication with the MP tool module 10 using RS-232 protocol. The Auto Handler 30 may thereby auto communicate with the MP tool module 10 without having to do any modifications to the existing programmable mass production program of the MP tool module 10 and henceforth increase the overall production efficiency.

Furthermore, during the communication process, when the Auto Handler 30 sends a processing command, for instance, "INITIALIZATION" for performing the formatting process or the initiating card process. The agent 20b automatically selects the corresponding dictionary unit 50a in accordance to the Auto Handler 30 through multiplexer 43a. The agent 20b then searching for a corresponding MP tool instruction in the dictionary unit 50a to conduct the conversion process. The corresponding MP tool instruction in this case may for instance be "OPEN CARD". The agent 20b then transmits the "OPEN CARD" instruction to the MP tool module 10 through the multiplexer 41. The MP tool module 10 then executes the "OPEN CARD" instruction and conducts a firmware writing and data formatting process on to the storage unit 33 through device controller 31 of the electronic device 3.

Similarly, when the Auto Handler 30 wishing to monitor the manufacturing process, the Auto Handler 30 may send "INQURY". Then the agent 20b converts into the MP tool instruction, for instance may be "STATUS" using the dictionary unit 50a and outputs to the MP tool module 10. The MP tool module 10 then outputs the corresponding mass production status data to the agent 20b. The agent 20b transforms the MP tool module generated status data into Auto Handler understandable format (e.g., following the specific communication protocol standard data format) and transmits to the Auto Handler 30.

In one implementation the MP tool module 10, the plurality of agents 20a~20n and the plurality of dictionary units 50a~50n may implemented on separated machines. For instance, the MP tool module 10 may be implemented on a desktop by executing the programmable mass production program code, wherein the desktop is coupled to a hub 2 with multiple ports for connecting to at least an electronic device 3. The plurality of agents 20a~20n and the plurality of dictionary units 50a~50n may be implemented on a laptops computers, wherein the plurality of agents 20a~20n may be generated by executing the programmable agent program code associated with each agent. The MP tool module 10 can communicate with the plurality of agents 20a~20n using a selected first communication protocols (i.e. RS-232, TCP/IP or UDP). The MP tool module 10 can further selected a specific agent of the second communication protocol (i.e. RS-232, TCP/IP or UDP) as the Auto Handler 30 to establish automated mass production process. The plurality of dictionary units 50a~50n may each developed as a lookup table in data file. The plurality of agents 20a~20n can select the corresponding dictionary unit by locating the associate data file.

In another implementation, the MP tool module 10, the plurality of agents 20a~20n, and the plurality of dictionary units 50a~50n may implemented on the same machines. For instance, the MP tool module 10, the plurality of agents 20a~20n, and the plurality of dictionary units 50a~50n may be separate executable program files stored on a desktop or a laptop. The MP tool module 10 may be implemented by executing the programmable mass production program code. The plurality of agents 20a~20n may be implemented by executing the programmable agent program code. The programmable agent program may through software and hardware implementation configures the corresponding types of communication protocols. The MP too module 10 may in this case communicate with the plurality of agents 20a~20n using software based interface, i.e., the first communication protocol may be software-implemented. A selected agent from the plurality of agents 20a~20n may further utilize the implemented second communication protocol to communicate with the Auto Handler 30. Moreover, the plurality of agents 20a~20n can located the data file associated with the corresponding dictionary unit to perform the conversion process.

In addition, each dictionary unit 50a~50n may be implementing in a large single lookup table data file instead of multiple small lookup tables categorized according to the types of Auto Handler 30. The multiplexers 41, 43a~43n and 45 may also be implemented by software programming, those skilled in art should be able to infer the software implementation of the multiplexers, hence further descriptions are thereby omitted.

It is worth to noted that the implementation of the MP tool module 10, the plurality of agents 20a~20n, and the plurality of dictionary units 50a~50n may depend upon the actual design of the automated mass production system 1 and shall not limited by the present disclosure. Similarly, the predefined protocol selected between the MP tool module 10 and the first communication interface of the plurality of agents 20a~20n may depend upon the actual implementation of the MP tool module 10 and the plurality of agents 20a~20n. The number of agents adopted may depend upon the number of available second communication protocols in the automated mass production system 1. Furthermore, it is noted that the number of the electronic device 3 is not limited thereto, and the number of the electronic device 3 in practice may be larger than 2, such that a plurality of the electronic devices 3 can be produced once. Therefore, FIG. 1 only serves as an illustration system block diagram for an automated mass production system and the present disclosure shall not be limited hereto.

(An Exemplary Embodiment of an Automated Mass Production System)

Figure 2:
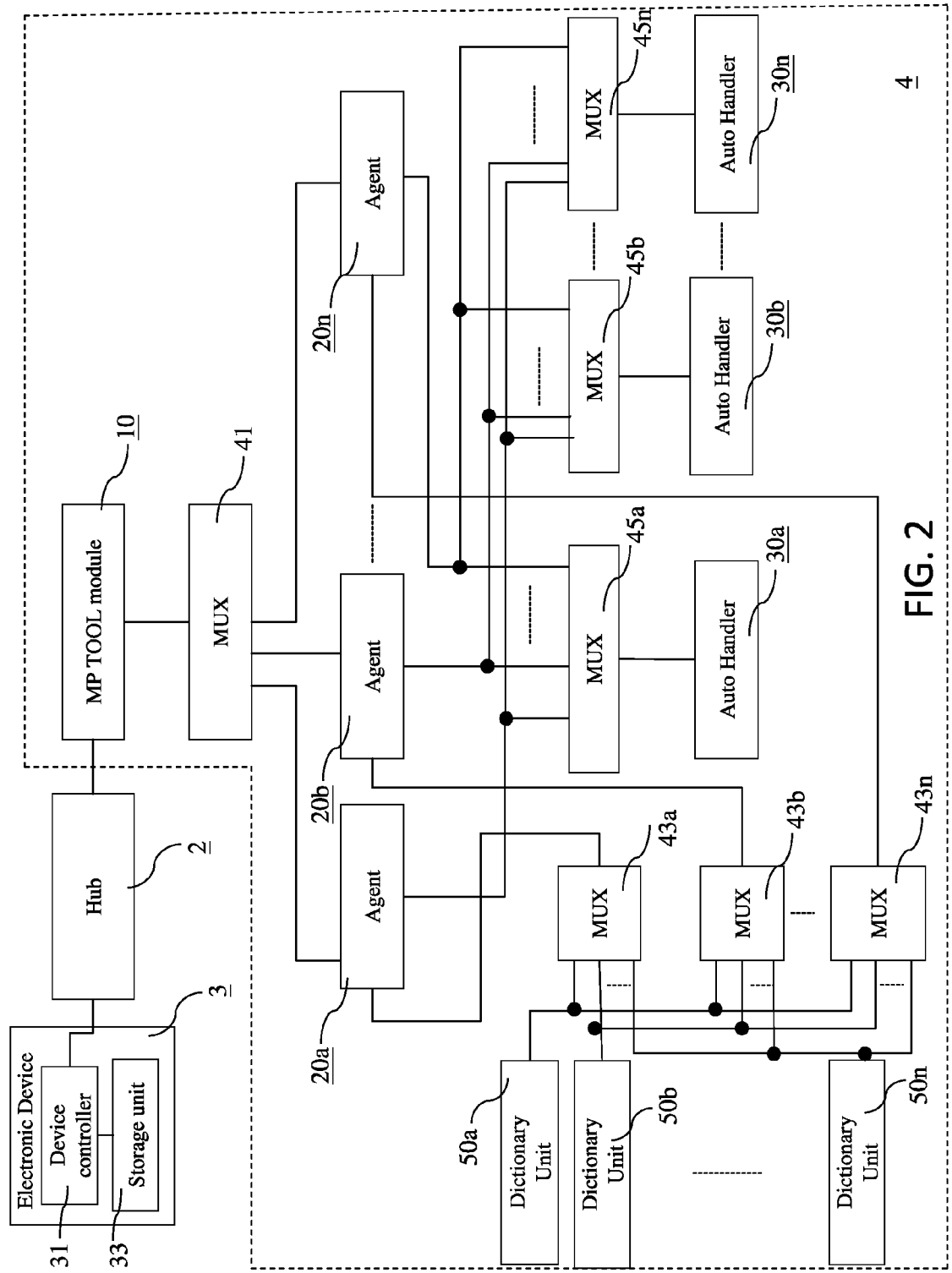
FIG. 2 depicts a block diagram of an automated mass production system in accordance to an exemplary embodiment of the present disclosure.

Please refer to FIG. 2 in conjunction with FIG. 1. FIG. 2 illustrates a block diagram of an automated mass production system in accordance to another exemplary embodiment of the present disclosure. The automated mass production system 4 is coupled to the hub 2 and at least an electronic device 3 is coupled to the hub 2. The basic structure and operation theory of the automated mass production system 4 is same as the automated mass production system 1. The automated mass production system 4 operates to perform automated mass production process to at least an electronic device 3. The difference between the automated mass production system 4 in FIG. 2 and the automated mass production system 1 in FIG.

1 is that the automated mass production system 4 includes a plurality of Auto Handler 30a~30n and a plurality of multiplexer 45a~45n. In the automated mass production system 1, only a single Auto Handler 30 may be coupled indirectly to the MP tool module 10 and to control the operation thereof. When the Auto Handler 30 is down, the mass production process must be halt, until either the Auto Handler 30 is being repaired or being replaced by another one. Further, each time the manufacturer want to switch to another Auto Handler 30, the corresponding system set up must be reconfigured. Moreover, in the automated mass production system 1, manufacturer is unable to increase the production volume by mass producing multiple electronic devices 3 for different customers using different automated equipment.

In the automated mass production system 4, there are multiple Auto Handlers 30a~30n of the same or different vendors, coupled to the MP tool module 10 through the plurality of agents 20a~20n. Any one of the Auto Handler 30a~30n may through an appropriate agent controls the operation of the MP tool module 10. The operation may be elaborated as follow, the MP tool module 10 may first determine which Auto Handler to communicate and select the agent accordingly to perform the communication protocol conversions and data communication.

As depicted in FIG. 2 the MP tool module 10 may through agents 20a~20b auto-select one of the Auto Handler 30a~30n to establish communication with. The Auto Handler 30a~30n represent automated equipment developed by same or different venders. Consequently, the Auto Handler 30a~30n of different vender may have different processing commands while the Auto Handler 30a~30n of same vender may use same set of processing commands thereby can share same dictionary unit. For instance, the Auto Handler 30a and 30b are of the same vender and dictionary 50a corresponds to the Auto Handler 30a. Then the Auto Handler 30a and 30b may uses the same processing commands, hence the selected agent can select the dictionary 50a for both the Auto Handler 30a and 30b when converting a processing command into a corresponding MP tool instruction. The Auto Handler 30a~30n are of different sets of proprietary communication protocols (i.e., the second communication protocols). Specifically, the plurality of agents 20a~20n are coupled to the MP tool module 10 through the multiplexer 41. The plurality of agents 20a~20n are respectively coupled to the Auto Handler 30a~30n through a plurality of multiplexers 45a~45n. For instance, the agent 20a is coupled to the Auto Handler 30a through the multiplexer 45a. Alternatively, the number of multiplexers 45a~45n is equal to the number of the Auto Handlers 30a~30n employed in the system. The dictionary units 50a~50n in the instant embodiment may corresponding to each of the Auto Handler 30a~30n. For instance, the dictionary unit 50a may correspond to the Auto Handler 30a. The dictionary unit 50b may correspond to the Auto Handler 30b and so on.

In the automated mass production system 4, the programmable mass production program of the MP tool module 10 may determine which Auto Handler 30a~30n to communicate for a given mass production process. When the programmable mass production program of the MP tool module 10 determines an Auto Handler to communicate, the MP tool module 10 then outputs the agent selection signal AS_SIG to the multiplexer 41 to select the agent using the second communication protocol of the selected Auto Handler to start the automatic mass production process.

Additionally, the Auto Handler 30a~30n may be perform same manufacturing process, thus when one Auto Handler 30i, i=a, . . . , n is down, the MP tool module 10 can through the selected agent connected with another Auto Handler 30j (i.e., j=a, . . . , n and j≠i). Moreover, when perform different mass production processes, the system can automatically switch to a specific Auto Handler and conduct the desire mass production process associated with the electronic device 3.

Specifically, if the programmable mass production program of the MP tool module 10 wish to establish communication with the Auto Handler 30b. The programmable mass production program of the MP tool module 10 outputs the agent selection signal AS_SIG to the multiplexer 41 to select a proper agent, e.g., agent 20b as the communication interface between the MP tool module 10 and the Auto Handler 30b. The agent 20b further outputs the communication signal SET_SIG to the designated multiplexer 45b to establish communication between the agent 20b and the Auto Handler 30b. The Auto Handler 30b may then automatically transmits the processing commands through agent 20b to the MP tool module 10. The processing commands are translated or equivalently converted by the agent 20b using the corresponding dictionary unit 50a.

The rest of system operation and structure of the automated mass production system 4 is essentially the same as the automated mass production system 1. Based on the above elaborations, those skilled in the art should be able to understand the operation of the automated mass production system 4 as well as deduce other configurations of the automated mass production system structures, and further descriptions are hereby omitted.

It is worth to note that the number of Auto Handler employed in the system may depend upon the actual processing requirements. In practice, some of the Auto Handler 30a~30n are developed by the same venders, hence may share same dictionary unit. Therefore, the number of dictionary units required in the system may vary. Similarly, the number of agents adopted in the system may depend upon the possible types of the second communication protocols employed by the Auto Handler 30a~30n. Nevertheless, FIG. 2 is only an illustration of an automated mass production system for manufacturing non-volatile memory devices and shall not be limited by the present disclosure.

(An Exemplary Embodiment of an Automated Mass Production System)

Figure 3:
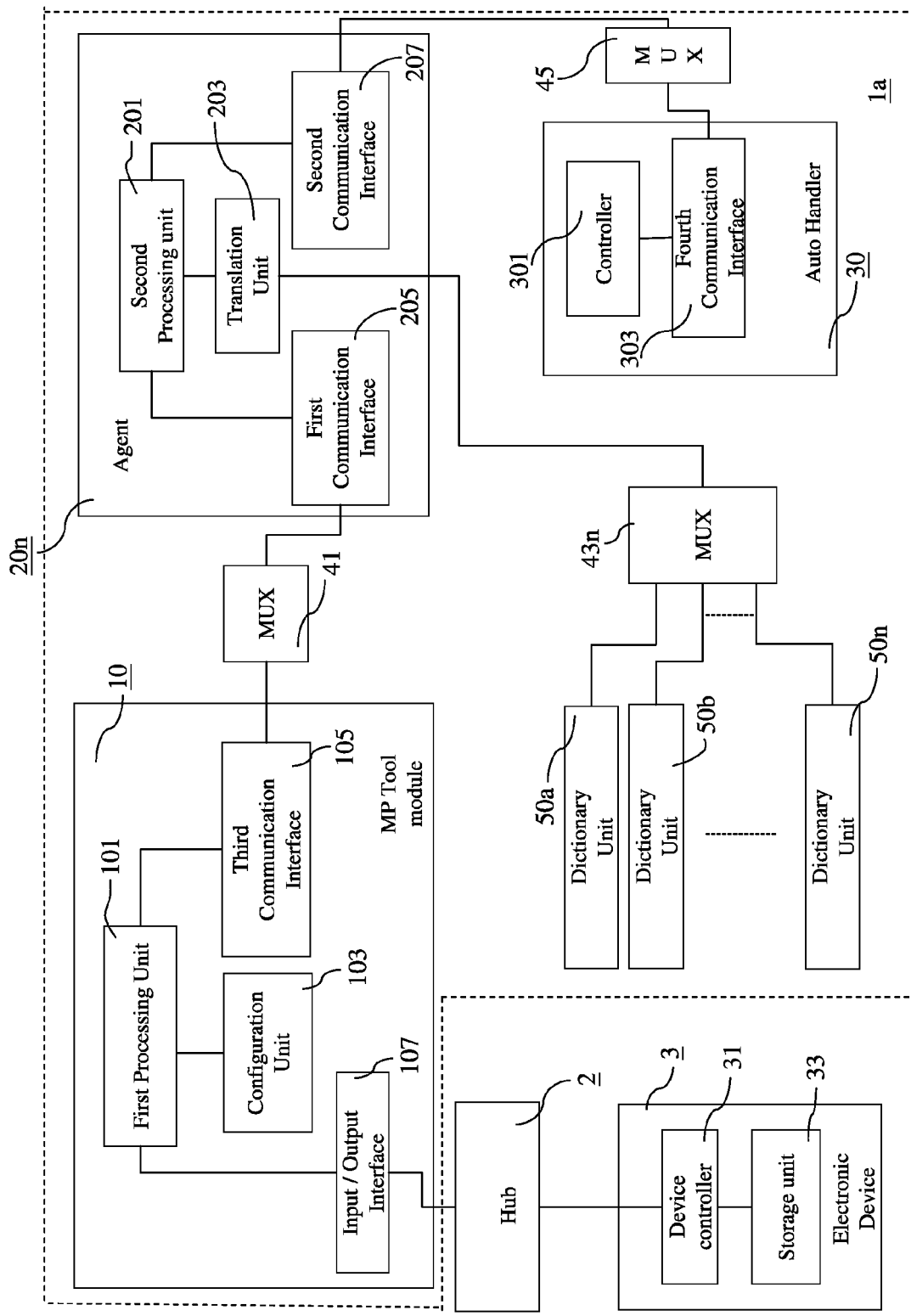
FIG. 3 depicts a function block diagram of an automated mass production system in accordance to one exemplary embodiment of the present disclosure.

Next, please refer to FIG. 3, which illustrates a function block diagram of an automated mass production system in accordance to one exemplary embodiment of the present disclosure. The automated mass production system 1a is coupled to the hub 2 and the hub 2 is coupled to at least an electronic device 3.

The electronic device 3 is a work piece to the automated mass production system 1. The electronic device 3 in the instant embodiment may be a pen drive storage devices, an MP3 player, a digital camera or a mobile phone. The storage unit 33 is a non-volatile flash memory storage unit, implemented by the NAND flash, the NOR flash or the EEPROM. The electronic device 3 may be any flash cards including but not limited to PCI Express, Secure Digital (SD) card, Memory Stick (MS), Compact Flash (CF), Multi-Media-Card (eMMC), IDE, and SATA flash memory cards. The automated mass production system 1a may be utilized to perform automated mass production process (e.g., low-level formatting, encryption, disk type configuration) by means of writing the firmware and production parameters through the device controller 31 onto the storage unit 33.

The automated mass production system 1a includes a MP tool module 10, an agent 20n, an Auto Hander 30, and a plurality of dictionary units 50a~50n. The agent 20n operates to establish communication between the MP tool module 10 and the Auto Handler 30. The Auto Handler 30 in the instant embodiment represents automated equipment having a predefined proprietary protocol set by a vender.

The MP tool module 10 is coupled to the agent 20n through a multiplexer 41. The agent 20n is coupled to the Auto Handler 30 through a multiplexer 45. The dictionary units 50a~50n are coupled to a multiplexer 43n and the multiplexer 43n is further coupled to the agent 20n. The agent 20n may thereby bridge the MP tool module 10 and the Auto Handler 30 to establish the automated mass production process.

Specifically, the MP tool module 10 in the instant embodiment includes a first processing unit 101, a configuration unit 103, a third communication interface 105, and an input/output interface 107. The configuration unit 103, the third communication interface 105, and the input/output interface 107 are coupled to the first processing unit 101, respectively.

The first processing unit 101 contains an executable programmable mass production program for performing the assigned mass production process onto the storage unit 33 through the device controller 31 of the connected electronic device 3. The configuration unit 103 stores production configuration files, wherein the processing configuration files contain the configured production parameters associated with the automated mass production processes associated with the connected electronic device 3 including but not limited to product line ID, vender ID, product ID, serial number, disk type, and etc.

The configuration unit 103 outputs the configured production parameters to the first processing unit 101 to facilitate the automated mass production processes in manufacturing electronic device 3. The third communication interface 105 is used as a data transmission interface between the MP tool module 10 and the agent 20n.

The first processing unit 101 can output a data (e.g., agent selection signal AS_SIG and mass production status) through the third communication interface 105 to select the agent 20n and to transmit mass production status data to agent 20n. The first processing unit 101 also receives data (i.e., converted MP tool instruction) from the selected agent 20n through the third communication interface 105.

The input/output interface 107 is used as an interface between the MP tool module 10 and the electronic device 3 (e.g., an electronic device with non-volatile memory storage unit). The first processing unit 101 can through the input/output interface 107 perform mass production operations. For instance, the first processing unit 101 may through input/output interface 107 and hub 2 write the configured firmware into the storage unit 33 through the device controller 31 of the electronic device 3. The first processing unit 101 may through input/output interface 107 reset the status of the hub 2. Similarly, the first processing unit 101 may through input/output interface 107 receives the processing status of hub 2. In addition, the type of the first communication protocol adopted by the third communication interface 105 may be configured by the programmable mass production tool program stored in the first processing unit 101.

The agent 20n includes a second processing unit 201, a translation unit 203, a first communication interface 205, and a second communication interface 207. The translation unit 203, the first communication interface 205, and the second communication interface 207 are respectively coupled to the second processing unit 201. The second processing unit 201 includes an executable programmable agent program for performing communication protocol conversion and regulating data transmission between the MP tool module 10 and the Auto Handler 30. The translation unit 203 is coupled to the plurality of dictionary units 50a~50n through the multiplexer 43n. The translation unit 203 is used for translating or equivalently converting the processing commands into the MP tool instructions. Specifically, the translation unit 203 controls the multiplexer 43n to select the appropriate dictionary unit out of the plurality dictionary unit 50a~50n and look up for the corresponding MP tool instruction according the processing commands within the selected dictionary unit.

The first communication interface 205 is used for data transmission between the MP tool module 10 and the agent 20n. The first communication interface 205 of the agent 20n is configured to use the same type of the first communication protocols as the third communication interface 105 of the MP tool module 10. The second communication interface 207 is used for data transmission between the agent 20n and the Auto Handler 30. The second communication interface 207 of the agent 20n is configured to use the same type of the second communication protocols as the Auto Handler 30.

In particular, when the first communication interface 205 receives the data outputted from the third communication interface 105 of the MP tool module 10, the second processing unit 201 converts the data into the communication protocol data format adopt by the Auto Handler 30. Similarly, when the second communication interface 207 receives the processing commands outputted from the Auto Handler 30, the second processing unit 201 drives the translation unit 203 and converts the given processing command into MP tool instruction. After obtained the converted MP tool instruction, the second processing unit 201 controls the first communication interface 205 and outputted in the first communication protocol format through the multiplexer 41 to the third communication interface 105 of the MP tool module 10.

The Auto Handler 30 includes a controller 301 and a fourth communication interface 303. The fourth communication interface 303 is coupled to the controller 301. The fourth communication interface 303 is further coupled to the second communication interface 207 through the multiplexer 45. The controller 301 contains executable programmable manufacturing program and is used to automatically generate processing commands according to the automated mass production process routine. The processing commands may include functions but not limited to reset hub status, open card firmware writing process (or initiating card process), MP tool module 10 shut down, stop the manufacturing process, flash card connection test, and mass production status inquiry. In one implementation, the processing commands for the above described functions may be "RESET HUB", "OPEN CARD", "SHUT DOWN MP TOOL", "STOP", "CHECK", and "INQUARY", respectively. However, as described previously, the Auto Handler 30 of different venders many have different sets of processing commands, and shall not be limited to examples provided herein.

The fourth communication interface 303 is coupled to the second communication interface 207 of the selected agent 20n through the multiplexer 45. The fourth communication interface 303 is responsible for the data transmission between the selected agent 20n and the Auto Handler 30. The fourth communication interface 303 is configured to use the preset second communication protocol for data transmission. The Auto Handler 30 thus may through interfacing with the second communication interface 207 of the selected agent 20n communicate with the MP tool module 10 and controls the operation of the MP tool module 10 thereby achieve the concept of the automated mass production.

It is worth to note that the described communication protocols (i.e., the first and the second communication protocols) adopted in the automated mass production system 1a may be but not limited to a Recommended Standard 232 (RS-232), a Universal Serial Bus (USB) or internet protocols such as TCP/IP, UDP. However, the types of the first communication protocol adopted between the MP tool module 10 and the agents 20n or the types of the second communication protocol adopted between the agent 20n and the Auto Handler 30 may depend upon actual system implementations and/or operation requirements and is not limited to the examples provided by the instant embodiment. Moreover, FIG. 3 only serves as an exemplary implementation of the described automated mass production system for manufacturing non-volatile memory devices and shall not be used to limit the present disclosure. Alternatively, the exact structure of the MP tool module 10, the agent 20n, the dictionary units 50a~50n and the multiplexer 41, 43a~43n, 45 may depend up on a specific system design and/or operational requirements and is not limited by the instant embodiment.

(An Exemplary Embodiment of an Automated Mass Production Method)

Figure 4:
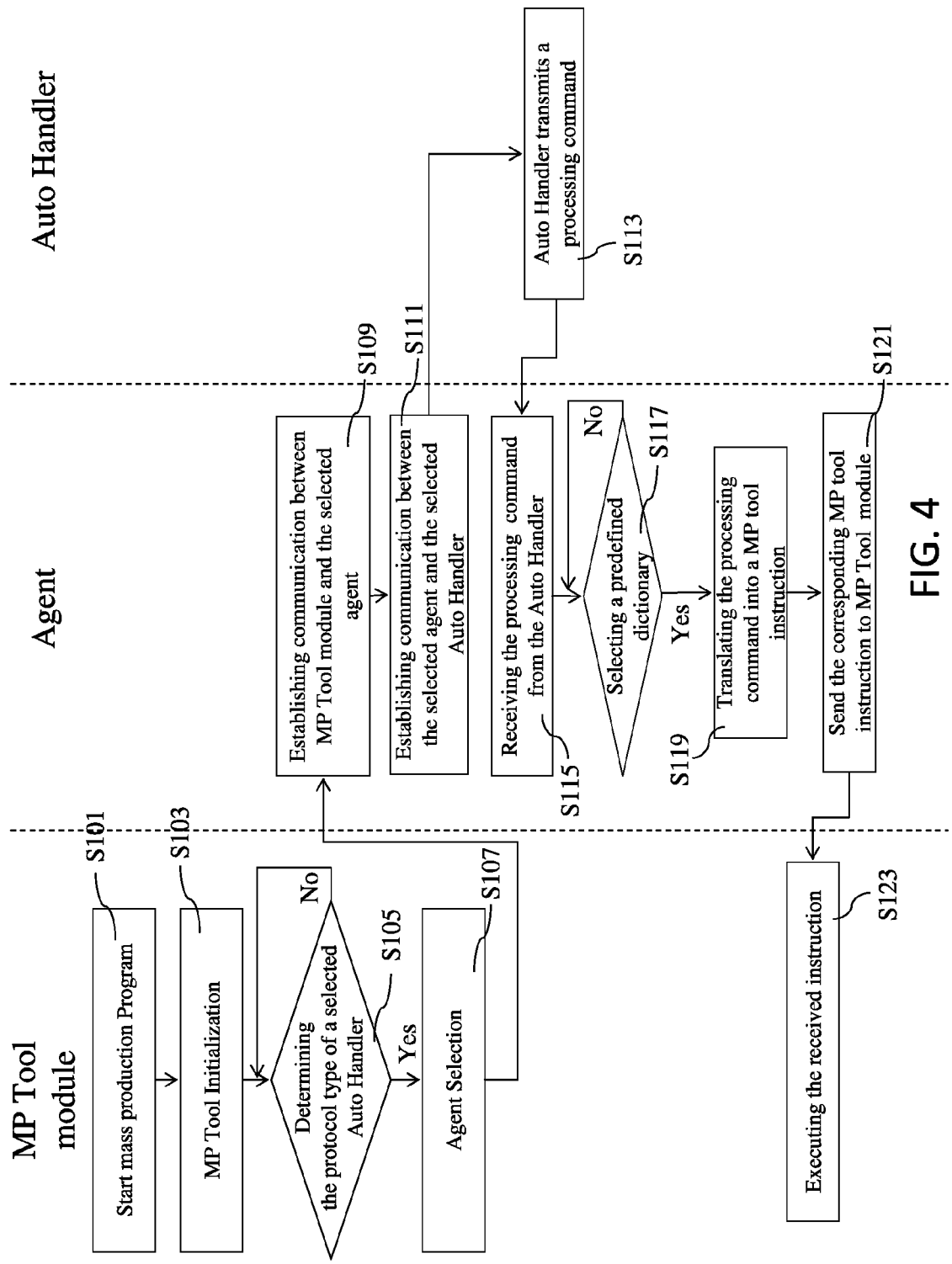
FIG. 4 depicts a flow diagram describing an automated mass production method in accordance to one exemplary embodiment of the present disclosure.

From the aforementioned exemplary embodiments, the present disclosure may generalize an automated mass production method for the automated production system illustrated in the aforementioned embodiment. Please refer to FIG. 4 in conjunction to FIG. 1. FIG. 4 illustrates an automated mass production method in accordance to one exemplary embodiment of the present disclosure.

In step S101, the MP tool module 10 starts the programmable mass production program. Next, in step S103, the programmable mass production program of the MP tool module 10 performs initialization. The initialization may include but not limited to testing hub 2 connections, loading configuration files, configuring the first communication protocol, and configuring automated mass production parameters associated with the electronic device 3 to be manufactured. The MP tool module 10 determines the type of communication protocol (i.e., the second communication protocol) used by the Auto Handler 30 (Step S105). When the MP tool module 10 determines the type of the second communication protocol adopted by the Auto Handler 30, executes to Step S107, otherwise executes Step S105.

In Step S107, the programmable mass production program executes the agent selection routine to select an agent using the same communication protocols as the second communication protocol from the plurality of agents 20a~20n. The MP tool module 10 outputs an agent selection signal AS_SIG to control the multiplexer 41 to establish the communication between the MP tool module 10 and the selected agent (Step S109). Concurrently, the selected agent outputs a communication setup signal SET_SIG to the multiplexer 45 to establish connection between the selected agent and the Auto Handler 30 (Step S111). Consequently, a data communication link may be established between the MP tool module 10 and the Auto Handler 30.

In addition, the connection between the MP tool module 10 and the selected agent may be tested by a test signal. For instance, the MP tool module 10 may generate and send a known first test signal using first communication protocol to the selected agent to verify the communication. Similarly, the connection between the selected agent and the Auto Handler 30 may also be tested by a test signal. For instance, the Auto Handler 30 may generate and send a known second test signal using the second communication protocol to the selected agent to verify the communication. Those skilled in the art should be able to deduce the implementation of a test signal, further descriptions are thereby omitted.

Once the communication between the MP tool module 10 and the Auto Handler 30 has been verified, the Auto Handler 30 generates processing commands (e.g., OPEN CARD, INQURY, OR RESET HUB) and outputted to the selected agent using the second communication protocols. (Step S113). The selected agent receives the processing commands through the multiplexer 45 (Step S115). Next, in Step S117, the agent select a predefined dictionary unit form the dictionary units 50a~50n in correspondence to the Auto Handler 30. Once the corresponding dictionary unit is selected, executes to Step S119, otherwise executes Step S117. In Step S119, the selected agent translates or converts the received processing command into a MP tool instruction. Then, the selected agent then sends the corresponding MP tool instruction through the multiplexer 41 to the MP tool module 10 (Step S121). The MP tool module 10 executes the received MP tool instruction to perform a particular function of the automated mass production process through the device controller 31 to the storage unit 33 of the electronic device 3. (Step S123).

Additionally, during any processed automated mass production, the MP tool module 10 may upon request outputs an information data in in first communication protocol data format to the selected agent. The information data contains the status of the corresponding automated mass production process for non-volatile memory devices (e.g., the production status on the storage unit 33 of the connected electronic device 3) and is generated according to an inquiry processing command outputted by the Auto Handler 30. The selected agent then converts the received information data into the second communication protocol data format and outputs the converted information data to the Auto Handler thereby enabling the Auto Handler to monitor the automated mass production progress.

Figure 5:
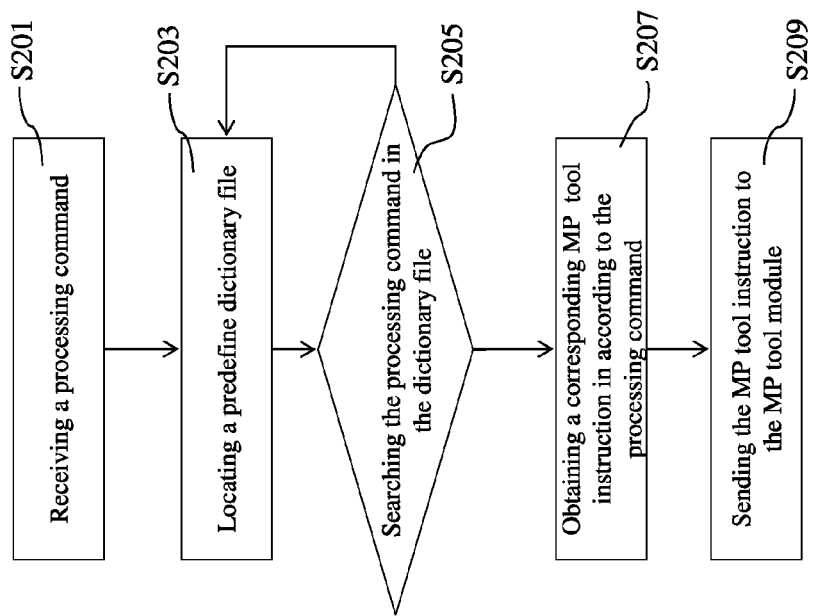
FIG. 5 depicts a flow diagram describing a processing command conversion method in accordance to one exemplary embodiment of the present disclosure.

Please refer to FIG. 5, which illustrates a flow diagram describing a processing command conversion method in accordance to one exemplary embodiment of the present disclosure.

In this illustration method, the dictionary units 50a~50n are implemented using a lookup table. The lookup table in the instant embodiment tabulates a plurality of processing commands and the corresponding MP tool instruction. Each dictionary unit in the instant embodiment further take form in a data file and can be located by an agent through the associated multiplexer 43n. When the selected agent received the processing command outputted from the Auto Handler 30, the selected agent immediate locates the corresponding dictionary file (Step S201 and S203). The selected agent searching within the selected dictionary file to find a match for the received processing command (Step S205). When the selected agent found a match for the received processing command in the dictionary unit, executes Step S207, otherwise executes Step S205. After obtained the corresponding MP tool instruction in accordance to the processing command in Step S207, the selected agent outputs the MP tool instruction to the MP tool module 10 to have the MP tool module 10 executes the MP tool instruction thereby establish automated mass production process.

It worth to note that in the instant embodiment, the dictionary units are implemented in separate data files in accordance to different Auto Handler 30. However, the dictionary units may be combined into a large lookup table file. Those skilled in the art should be able to deduce the implementation method of combining the multiple dictionary units 50a~50n collectively to form a large dictionary unit, hence further descriptions are therefore omitted. The detail implementation for the automated mass production method may be referred to the aforementioned exemplary embodiments, details descriptions are therefore omitted.

In summary, the automated mass production system of the present disclosure utilizes an agent to perform communication protocol conversion so as to establish the appropriate communication between the mass production tool and the automated equipment. The automated mass production system further includes at least a dictionary unit allowing the agent convert the processing command of the automated equipment into mass production tool executable instruction, thereby establish automated mass production. Alternatively, the described automated mass production system of the present disclosure facilitates the mass production tool to communicate with the automated equipment of different communication protocols to achieve the automated production without apply any modifications to the mass production tool. Consequently, the disclosed automated mass production system can reduce the overall production complexity and cost thereby increase the overall production efficiency.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. An automated mass production method, adapted for an automated mass production system in manufacturing at least an electronic device having a storage unit, wherein the automated mass production system comprises of a mass production tool (MP tool) module, a plurality of agents and at least an Auto Handler, wherein the plurality of agents is coupled between the MP tool module and the Auto Handler, the method comprising:
   determining a protocol type of the Auto Handler to select one of the agents;
   establishing a first communication protocol communication between the MP tool module and the selected agent;
   establishing a second communication protocol communication between the selected agent and the Auto Handler;
   the Auto Handler outputting a processing command to the selected agent;
   the selected agent converting the processing command into a MP tool instruction which is understood by the MP tool module; and
   the selected agent outputting the corresponding MP tool instruction to the MP tool module so as to have the MP tool module executed the MP tool instruction to automatically perform a corresponding mass production process to the electronic device.

2. The automated mass production method according to claim 1, wherein the method for converting the processing command further comprises:
   the selected agent locating a predefined dictionary file in accordance to the Auto Handler;
   searching for the received processing command within the predefined dictionary file;
   when a match being found, obtaining the corresponding MP tool instruction associated with the processing command; and
   the selected agent outputting the MP tool instruction to the MP tool module.

3. The automated mass production method according to claim 1, further comprising:
   the selected agent receiving an information data in the first communication protocol data format outputted by the MP tool module;
   the selected agent converting the information data into the second communication protocol data format; and
   the selected agent outputting the converted information data to the Auto Handler to enable the Auto Handler monitoring the progress of the mass production process;
   wherein the information data comprising the status of a mass production process on the storage unit of the electronic device and being generated according to an inquiry processing command outputted by the Auto Handler.

4. The automated mass production method according to claim 2, wherein the predefined dictionary file comprises a lookup table.

5. The automated mass production method according to claim 1, wherein the first and the second communication protocol comprise at least a type of a RS-232, a TCP/IP or a UDP.

6. An automated mass production system, adapted for manufacturing at least an electronic device having a storage unit, comprising:
   a mass production tool (MP tool) module, performing a mass production process to the electronic device according to an execution of a MP tool instruction and performing data communication using a predefined first communication protocol;
   at least an Auto Handler, generating a processing command according to an automated mass production process routine and outputting the processing command using a predefined second communication protocol to control the operation of the MP tool module; and
   a plurality of agents, coupled between the MP tool module and the Auto Handler, wherein only one agent being capable of receiving the processing command using the second communication protocol, converting the processing command into the MP tool instruction accordingly, and outputting to the MP tool module using the first communication protocol;
   wherein, the MP tool module determines the type of the second communication protocol, controls a first multiplexer to select an appropriate agent to establish communication between the MP tool module and the Auto Handler, wherein the selected agent further controls a second multiplexer to communicate with the Auto Handler to perform data communication between the MP tool module and the Auto Handler, thereby establish automated mass production processing flow.

7. The automated mass production system according to claim 6, further comprising:
   at least a dictionary unit, coupled to each agent through a third multiplexer, wherein the dictionary unit includes a set of processing commands in accordance to the Auto Handler and a set of the corresponding MP tool instructions in accordance to the MP tool module;
   wherein the selected agent further controls the third multiplexer to selected the appropriate dictionary unit and utilizes the dictionary unit to convert the received processing command into the MP tool instruction.

8. The automated mass production system according to claim 6, wherein each agent further comprises:
   a first communication interface, coupled to the MP tool module through the first multiplexer, performing data communication with the MP tool module using the first communication protocol; and
   a second communication interface, coupled to the Auto Handler through the second multiplexer, wherein the second communication interface comprises of a predefined communication protocol;

wherein the predefined communication protocol associated with the selected agent being the same as the second communication protocol.

9. The automated mass production system according to claim 7, wherein the MP tool module, the plurality of agents, and the dictionary unit are implemented on a computing machine.

10. The automated mass production system according to claim 9, wherein the MP tool module is implemented by executing a programmable mass production program code and each agent is implemented by executing a corresponding programmable agent program code.

11. The automated mass production system according to claim 6, wherein the first and the second communication protocol comprise at least one of a RS-232, a TCP/IP or a UDP.

12. The automated mass production system according to claim 6, wherein the storage unit is a non-volatile flash memory storage unit and comprises a type of at least a NAND flash, a NOR flash, or an EEPROM.

13. An automated mass production system, adapted for manufacturing at least an electronic device having a storage unit, comprising:
    a mass production tool (MP tool) module, performing a mass production process to the electronic device according to an execution of a MP tool instruction;
    an Auto Handler, generating a processing command according to an automated mass production process routine and outputting the processing command to control the operation of the MP tool module; and
    an agent, coupled between the MP tool module and the Auto Handler, capable of establishing the communication between the MP tool module and the Auto Handler by converting the processing command into the MP tool instruction, thereby establish automated mass production processing flow.

14. The automated mass production system according to claim 13, further comprising:
    a dictionary unit, coupled to the agent, including a set of processing commands in accordance to the Auto Handler and a set of the corresponding MP tool instructions in accordance to the MP tool module; wherein the agent utilizes the dictionary unit to convert the received processing command into the MP tool instruction.

15. The automated mass production system according to claim 13, wherein the MP tool module performing data communication using a predefined first communication protocol and the Auto Handler outputting the processing command using a predefined second communication protocol.

16. The automated mass production system according to claim 15, wherein the agent further comprises:
    a first communication interface, coupled to the MP tool module, performing data communication with the MP tool module using the first communication protocol; and
    a second communication interface, coupled to the Auto Handler, wherein the second communication interface comprises of the second communication protocol.

17. The automated mass production system according to claim 16, wherein the first and the second communication protocol comprise at least a type of a RS-232, a TCP/IP or a UDP.

18. The automated mass production system according to claim 13, wherein the MP tool module is implemented by executing a programmable mass production program code and the agent is implemented by executing a corresponding programmable agent program code.

* * * * *